United States Patent

Kent

[15] 3,705,470

[45] Dec. 12, 1972

[54] GLAZING WINDOWS OR WINDSCREEN OPENINGS, PARTICULARLY IN VEHICLE BODIES

[72] Inventor: Cecil Kent, Woking, England
[73] Assignee: Creators Limited, Surrey, England
[22] Filed: Oct. 10, 1969
[21] Appl. No.: 865,428

Related U.S. Application Data

[63] Continuation-in-part of Ser. No. 827,633, May 26, 1969, abandoned.

[30] Foreign Application Priority Data

March 21, 1969  Great Britain...........15,106/69
Aug. 1, 1969    Great Britain...........38,765/69
Oct. 1, 1969    Great Britain...........48,325/69

[52] U.S. Cl. .......................52/208, 52/400, 296/93
[51] Int. Cl. ..............................................E06b 3/56
[58] Field of Search........52/397, 398, 400, 208, 402, 52/741; 296/93

[56] References Cited

UNITED STATES PATENTS

| 2,056,024 | 9/1936 | Stuart.........................52/400 |
| 2,246,409 | 6/1941 | Cheston......................52/208 |
| 2,647,289 | 8/1953 | Harbert......................52/208 |
| 2,671,541 | 3/1954 | Kramer.......................52/208 |
| 2,736,404 | 2/1956 | Clingman....................52/208 |
| 2,794,218 | 6/1957 | Ramsay......................52/400 |
| 3,078,119 | 2/1963 | Premo........................52/208 |
| 3,274,740 | 9/1966 | Hall...........................52/208 |

FOREIGN PATENTS OR APPLICATIONS

| 612,810   | 1926 | France.........................296/93 |
| 1,394,484 | 1965 | France.........................52/400 |
| 967,544   | 1964 | Great Britain...............52/397 |
| 678,819   | 1952 | Great Britain...............52/397 |
| 1,013,322 | 1965 | Great Britain...............52/208 |

Primary Examiner—John E. Murtagh
Attorney—Larson, Taylor & Hinds

[57] ABSTRACT

The invention relates to glazing window or windscreen openings, particularly in vehicle bodies by securing the glass, with a trim strip surrounding its edge, in the rebate of the opening by means of an adhesive pressed between the glass and/or the trim strip and the rebate. The trim strip is made of flexible plastics material with a channel portion which embraces the edge of the glass, and a front decorative strip portion which extends from and can hinge relative to the edge of the front wall of the channel portion which lies on the inside of the trim strip when it is fitted around the glass. The outer edge of the front portion bears against the front of the rebate. By this construction the inside edge of the trim strip is urged close against the glass, and any tendency to buckling is avoided.

16 Claims, 13 Drawing Figures

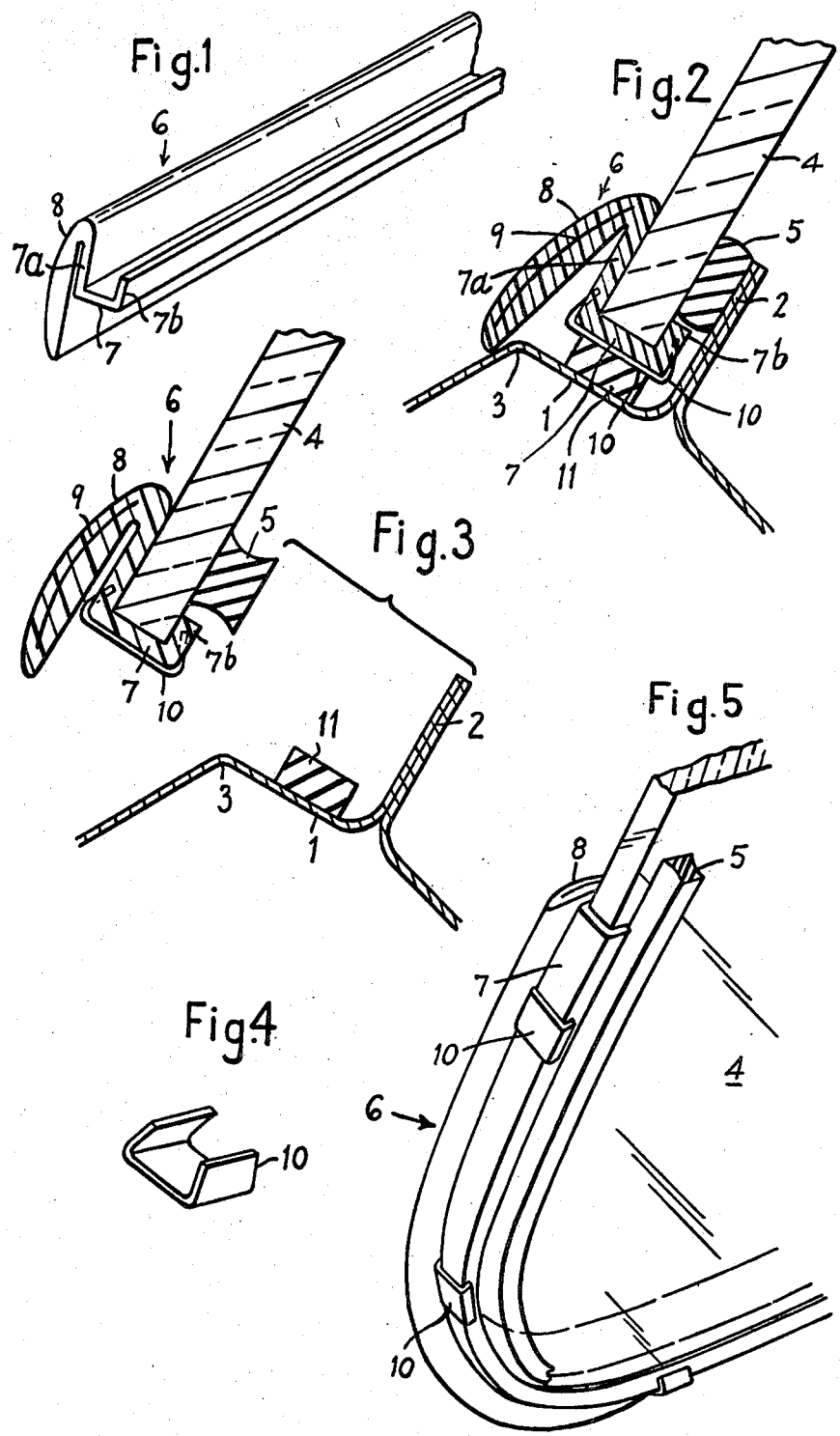

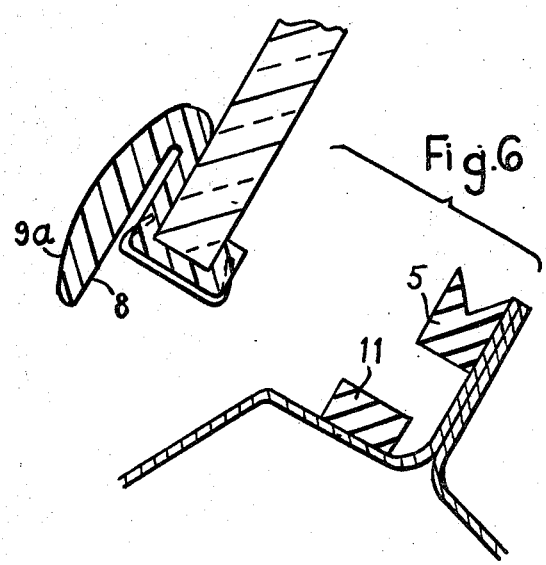
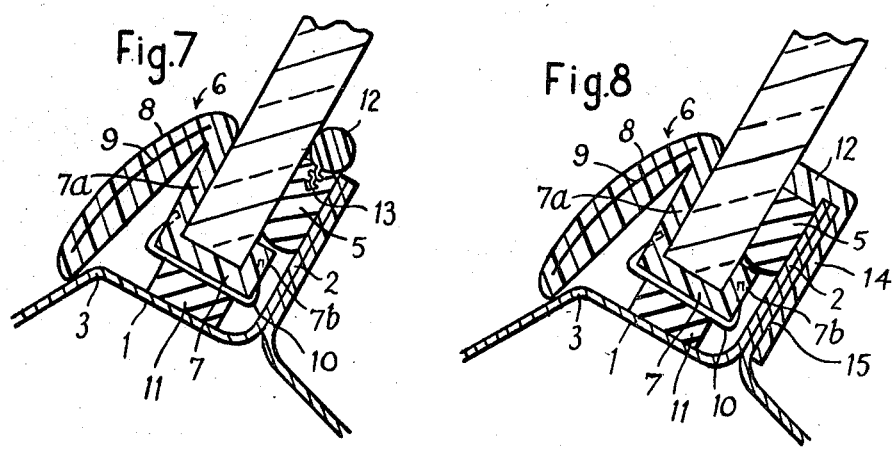
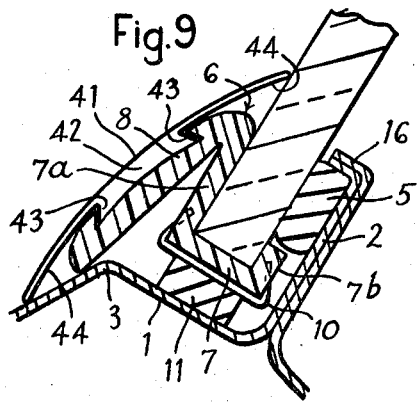
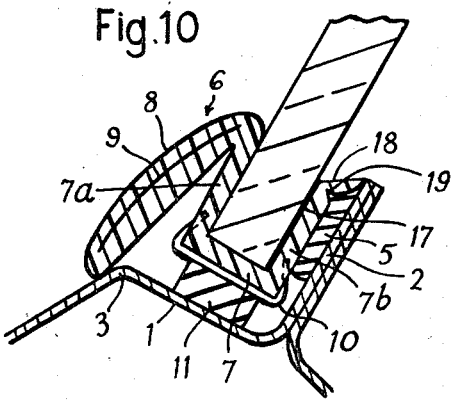

PATENTED DEC 12 1972 3,705,470

GLAZING WINDOWS OR WINDSCREEN OPENINGS, PARTICULARLY IN VEHICLE BODIES

RELATED APPLICATIONS

This application is a continuation-in-part of my copending application Ser. No. 827,633 for IMPROVEMENTS IN GLAZING WINDOWS OR WINDSCREEN OPENINGS, PARTICULARLY IN VEHICLE BODIES filed 26th May, 1969 now abandoned.

SUMMARY OF THE INVENTION

The present invention relates to glazing window or windscreen openings, particularly in vehicle bodies, in which the glass (which term is used herein to include other transparent materials) is secured in the rebate of the opening with the aid of an adhesive, and a trim strip made of rubber or a flexible plastics material surrounds the edge of the glass.

The invention is particularly concerned with the construction of the trim strip and to methods of glazing using this trim strip.

The trim strip according to the invention is made, preferably by extrusion, of a flexible plastics material, such as polyvinyl chloride, or a rubber-like elastomer, and comprises a channel portion dimensioned to embrace the edge of the glass and a front strip portion which extends from the edge of the front wall of the channel, that is the wall which is to lie against the outer surface of the glass, so as to overlie said front wall and project beyond the base of the channel, said front strip portion being free to flex away from said front wall of the channel about its junction with said edge of said front wall. Such flexing occurs when the edge of the front strip portion which projects below the channel base engages with the front of the rebate when the glass, with the trim strip fitted around its periphery, is inserted in the rebate to stick the glass therein. The front strip portion thus encloses the space between the edge of the glass and the rebate, and the fact that the flexing of the front strip portion relative to said front wall occurs along the inner edge of the trim strip, when it is fitted around the edge of the glass, ensures that the inner edge of the trim strip is urged close against the glass, even around curves at the corners of the glass panel, as well as providing pressure contact between the free outer edge of the front strip portion and the front of the rebate.

The invention also consists in a window or windscreen assembly in which the glass is stuck by adhesive to the back of a rebate defining an opening in which the glass is fitted, and the edge of the glass is surrounded by a trim strip of a flexible plastics material or a rubber-like elastomer comprising a channel portion embracing the edge of the glass and a front strip portion which extends from the inner edge of the front wall of the channel portion, which lies against the front of the glass, in a direction which overlies said front wall, the free edge of the said front strip portion engaging the front of the rebate.

According to a feature of the invention the channel portion of the trim strip is additionally secured to the edge of the glass by retaining clips which are sprung or clamped over the channel portion at selected positions around the edge of the glass.

The front strip portion is preferably provided with a decorative metallic appearance. For example, the trim strip may be extruded of a transparent or translucent plastics material and have a metal foil, for example aluminum foil, embedded therein so as to be visible through the front surface of the front strip portion, or a decorative metallized plastics foil or metal-plastics foil laminate may be bonded to the front surface of said front strip portion.

The invention also consists in a method of glazing a window or windscreen opening in the form of a rebate, which consists in assembling a trim strip as above described around the glass with the edge of the glass embraced by the channel portion of the trim strip, applying to the back of the rebate and/or the back of the glass, either before or after assembling the trim strip thereto, an adhesive around a zone which will be hidden behind the front strip portion of the trim strip, and inserting the assembly into the opening to bring the free edge of the front strip portion into contact with the front of the rebate, and pressing the assembly further into the opening to compress the adhesive between the back of the glass and the back of the rebate and to flex the front strip portion away from the front wall of the channel portion of the strip.

In order that the invention may be more clearly understood, reference will now be made to the accompanying drawing in which:

FIG. 1 is a perspective view of a trim strip according to the invention.

FIG. 2 is a scrap section through a part of an automobile body windscreen opening with the glazing completed according to this invention.

FIG. 3 is a view similar to FIG. 2 but showing the glazing assembly and body opening in exploded relation prior to securing the glazing assembly in the body opening according to one procedure for carrying out the method of this invention.

FIG. 4 is a perspective view of a spring retaining clip.

FIG. 5 is a scrap perspective view of the glass and trim strip assembly of FIG. 3 prior to the insertion in the body opening.

FIG. 6 is a view similar to FIG. 3, but showing a modified procedure of assembly in which the adhesive is initially applied to the back of the rebate instead of to the back of the glass.

FIGS. 7 to 10 are views, similar to FIG. 2, showing various modifications.

Figure 11:
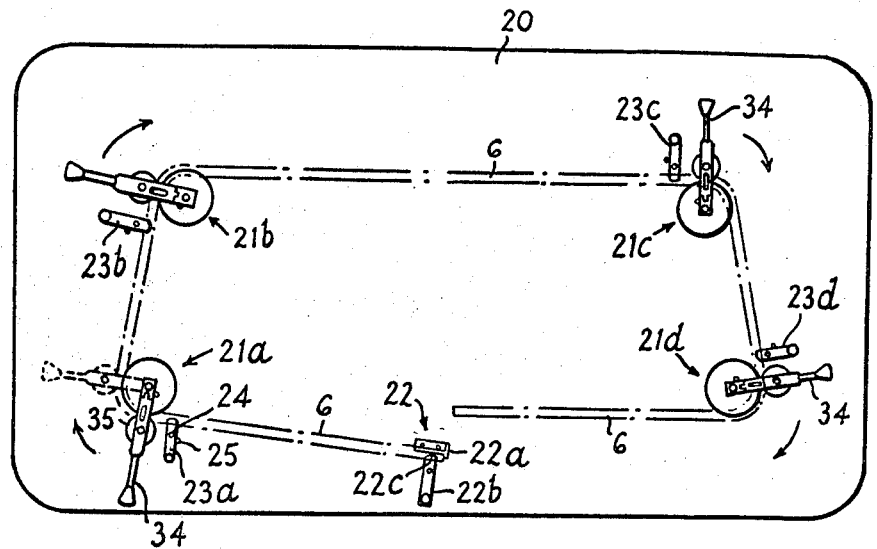
FIG. 11 is a plan view of a jig for forming the trim strip to a shape to fit around the edge of a windscreen.

Referring to FIGS. 1 to 5 of the drawings, 1 represents part of a vehicle body adjacent the windscreen opening formed by a rebate having a back wall 2 and a front shoulder 3. The glass 4 is stuck to the rear wall 2 of the rebate by a mass of adhesive sealant 5, for example a butyl rubber adhesive sealant, or it may be of the thermosetting type. Surrounding the edge of the glass panel 4 is a trim strip 6 extruded of a flexible plastics material, such as polyvinyl chloride, with the configuration shown in FIG. 1. As shown it comprises a channel-shaped portion 7 adapted to embrace the edge of the glass. From the top edge or lip of the front wall 7a of this channel portion extends a front strip portion 8, which overlies said front wall and is wider than the depth of the front wall 7a so that its free edge projects beyond the base of the channel portion sufficiently to engage against the front 3 of the rebate when the glass and trim strip assembly is inserted in the windscreen opening, the front strip portion thereby enclosing the space between the edge of the glass and the rebate. The plastics material joining the front strip portion 8 and said edge or lip forms a flexible hinge junction which, being the only connection between the front strip portion and the channel portion, allows the front strip portion 8 to flex away from the front wall 7a, as shown in FIG. 2, when the assembly is pressed in to the rebate with the free edge of the front strip portion bearing against the front 3 of the rebate.

The rear wall 7b of the channel portion is of less depth than the front wall 7a so that the adhesive 5 can be applied to the back of the glass around a zone adjacent the edge thereof which lies behind and will be hidden by the front wall 7a and front strip portion 8.

The front strip portion 8 is preferably constructed to provide a decorative metallic appearance to which end, in the embodiment shown in FIGS. 2 and 3, the extrusion is made of a transparent material such as crystal clear polyvinyl chloride, with a strip of aluminum foil 9 embedded or encapsulated in said front strip portion so that its bright surface is visible through the front thereof.

In another embodiment, as shown in FIG. 6, the decorative metallic appearance is provided by bonding a decorative layer 9a, e.g., a strip of metal foil covered with a transparent protective layer, to the front surface of the front strip portion 8. The decorative layer 9a may consist of a metal-plastics foil laminate comprising a strip of metal foil, e.g., aluminum foil, laminated between two layers of plastics foil of which at least one is transparent, e.g., transparent P.V.C., or MYLAR (Trade Mark) and forms the front surface when the laminate is bonded to the front strip portion 8, and of which the other is capable of being bonded by adhesive and/or heat to the front surface of the front strip portion 8. The laminate may also be constructed as described in the specification of my co-pending Application Ser. No. 845,155 filed July 28, 1969 for "-Decorative Plastics Strips and Extrusions". When the decoration is provided by bonding a decorative layer to the front of the strip portion 8, as shown in FIG. 6, it is not necessary for the trim strip 6 to be extruded from transparent plastics material.

The trim strip which extends completely around the edge of the glass, may be additionally secured to the glass by adhesive and/or by retaining clips 10, conveniently spring metal clips, as shown in FIG. 4, fixed at suitably selected positions around the edge of the glass. These clips may be applied by a preloaded hand tool dispenser.

According to one procedure for carrying out the method of this invention, the glass, prior to assembly in the rebate, has the trim strip fitted around the edge thereof and the adhesive 5 applied to the back thereof as shown in FIG. 3 to form an assembly as shown in FIG. 5. This assembly is then offered up to the rebate so that the bottom of the channel 7 rests on spacer supports 11 secured to the bottom of the rebate, and the assembly is pressed inwards to press the adhesive 5 against the back wall 2 of the rebate. During this operation the front strip portion 8 is flexed away from the front wall 7a of the channel portion to the position shown in FIG. 2 by reason of the free edge of the front strip portion coming into engagement with the front 3 of the rebate. The supports 11 may comprise blocks of rubber or plastics material stuck to the bottom of the rebate.

According to another procedure for carrying out the method of this invention, the adhesive 5 is, as shown in FIG. 6, initially applied to the back of the rebate instead of to the back of the glass. The glass with the trim strip fitted around the edge thereof, is offered up to the rebate to rest on the spacer supports 11, and the glass is pressed against the adhesive and bonded thereto. Again during this operation the front strip portion 8 of the trim strip is flexed away from the front wall 7a as shown in FIG. 2.

If desirable for the adhesive used, a coating of a primer may be applied to the zones on the back of the glass and the back of the rebate where the adhesive is to be adhered. Also, depending on the adhesive used, a curing or other setting operation may be required firmly to stick the glass in the rebate. The adhesive is conveniently applied in the form of a ribbon and preferably has a cross-section which is tubular or waisted (as shown in FIG. 3) or has a groove, such as a V-groove as shown in FIG. 6, in order to improve its compressibility and to avoid the adhesive spewing out too much or over the rebate when the adhesive is compressed between the glass and the back of the rebate.

One adhesive which we have found to be satisfactory is the butyl rubber adhesive sealant known as "PTI Auto Glass Tape" made by Protective Treatments Inc. of Dellrose Avenue, Dayton, Ohio, U.S.A.

If it be desired to cover the mass of adhesive 5 where it is exposed between the back of the glass and the edge of the back wall 2 of the rebate, this may be effected by applying a further interior trim strip thereover.

For example, as shown in FIG. 7, this interior trim strip 12 may comprise a body portion, of any desired cross-section, which bridges the space between the back of the glass and the back wall 2 of the rebate, and is provided with a web 13 extending along its length (the web may be of "fir tree" cross-section as shown) which is embedded in the mass of adhesive 5. The interior trim strip, which may if desired be provided with a decorative metallic finish, may be pressed into the mass of adhesive after the glass has been inserted in to the window opening.

In another modification as shown in FIG. 8, the interior trim strip 12 is provided with a skirt portion 14 which extends over the edge of the back wall 2 of the rebate and may be secured, for example by sticking, to the surface 15 of the back wall 2 which faces the interior of the vehicle body. The body portion of the interior trim strip may simply be adhered to the mass of adhesive 5, or may also be provided with a web portion 13, similar to that of the embodiment of FIG. 7, which is embedded in the mass of adhesive.

FIG. 9 shows another method of covering in the mass of ahesive 5. In this embodiment, the edge of the back wall 2 of the rebate is formed with an outwardly projecting lip or flange 16 which extends around the window opening and overlies the mass of adhesive. The width of the lip or flange 16 is preferably such that a small clearance is left between the edge of the lip and the back of the glass when the glass is secured in the rebate.

Instead of applying the adhesive directly between the back of the glass and the back of the rebate, the channel portion 7 of the trim strip may be stuck to the glass and the said channel portion be secured by adhesive to the back of the rebate. In this case it is not necessary that the rear channel wall 7b should be of less depth than the front channel wall 7a.

An embodiment of this modification is illustrated in FIG. 10, in which the rear channel 7b, which is made made deeper than the rear channel wall in the embodiment of FIG. 2, has its inner surface stuck to the back of the glass by an adhesive indicated at 17, (a recess may be provided in said inner surface to receive the adhesive) and the outer surface of the rear channel wall is secured to the back wall 2 of the rebate by a mass of adhesive 5. In the embodiment shown, the rear channel wall 7b is provided at its top with a rearwardly directed lip 18 which is adapted to engage the back wall 2 of the rebate and enclose the mass of adhesive. A groove 19 may be formed at the junction between the top of the rear wall 7b and the lip 18 to facilitate the flexing of the lip when it engages the back wall 2 of the rebate.

In all embodiments, by reason of the hinge junction between the channel portion 7 and the front strip portion 8 being on the inner edge of the trim strip, when the trim strip is secured around the glass, the flexing of the front strip portion 8 away from the front wall 7a of the channel portion, when the assembly is secured in position, has the effect of causing the inner and outer edges of the front strip portion to be pressed into firm contact with the glass 4 and front 3 of the rebate respectively, even around the radius to which the trim strip is bent at the corners of the glass panel.

Further, by reason of the free outer edge of the front strip portion 8 being free of any reinforcing flange or enlargement such as is provided by the hinge junction with the channel portion at the inner edge of the front strip portion, and that only the said inner edge is so reinforced, the said free outer edge, and zones of the front strip portion across its width between its free outer edge and the hinge junction at its inner edge, are free to stretch sufficiently when the trim strip is bent around the normal radius at the corners of a windscreen, to avoid buckling of the inner edge of the front strip portion around such bends. The decorative metal foil also stretches across its width, to increasing degrees towards said free outer edge of the front strip portion, without any noticeable compression of the foil adjacent the inner edge of the front strip portion, whereby crinkling of the metal foil around bends of normal radius is avoided.

The rather flat or shallow convex cross-section of the front strip portion 8, and the fact that the inner and outer edges of the front strip portion lie snugly against the glass and the front of the rebate respectively, assist in reducing windscreen wind noise.

Figure 12:
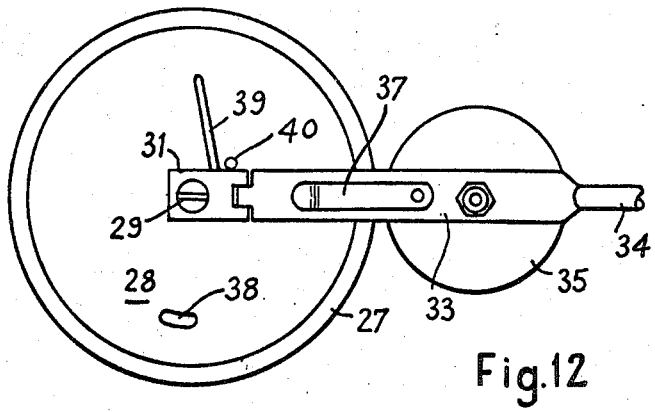
FIG. 12 is a plan view, on an enlarged scale, of one of the bending devices of the jig shown in FIG. 11.

To facilitate fitting the trim strip around the edge of the glass panel a length of the trim strip, corresponding to the length of the periphery of the glass panel, is prebent to the shape of the panel. A feature of this invention consists in an apparatus or jig for effecting the prebending which is illustrated in FIGS. 11 to 13.

This apparatus comprises a bench or table 20 on which are secured four bending devices 21a, 21b, 21c and 21d located respectively at positions corresponding to the four corners of the windscreen about which the trim strip is to be fitted. Also mounted on the bench is an end-lock member 22 comprising a fixed stop 22a and a lever 22b having a cam-shaped end 22c between which and the stop 22a the end of the length of trim strip to be bent is secured by the base of its channel portion 7 being wedged between the end of the lever and the stop when the lever is moved to the position shown in FIG. 11. Also mounted on the bench are four retainer members 23a, 23b, 23c and 23d which can be swung about their respective pivots 24 from the operative positions in which they are shown in FIG. 11 and rest against the stops 25 to inoperative positions by turning them in the clockwise direction from the positions shown.

Figure 13:
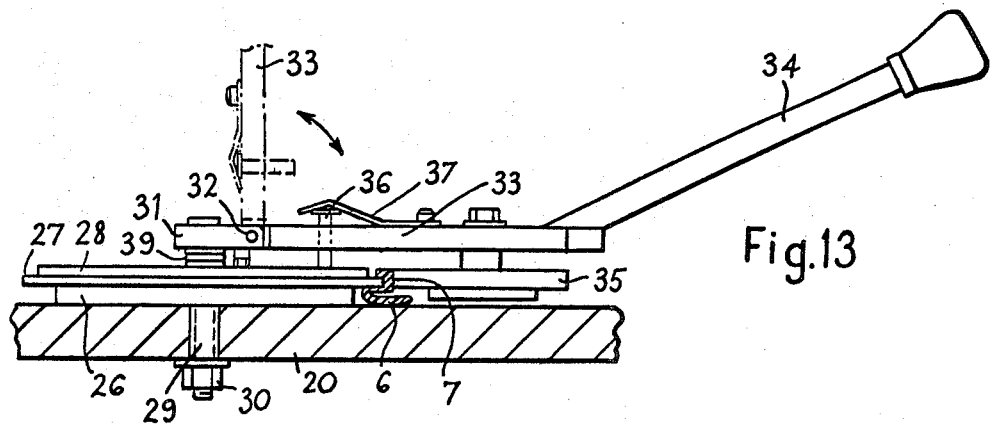
FIG. 13 is a side view of FIG. 12.

Each bending device comprises a circular forming member consisting of three superposed discs 26, 27, 28 of different diameters and fixed to the bench 20 by a central spindle 29 and nut 30 as shown in FIG. 13. The central disc 27 is of larger diameter than the other two discs and of a radius corresponding to the radius of curvature of the corresponding corner of the windscreen panel to which the trim strip is to be fitted. Its thickness corresponds to the width of the channel portion 7 and the thickness of the disc 26 is such that the front strip portion of the trim strip can be located between the disc 27 and the bench 20 as shown in FIG. 13.

Mounted on the top of the spindle 29 is a head 31 to which is pivotally connected by means of the pin 32 a bending arm 33, the free end of which caries an operating handle 34. The arm 33 carries therebeneath a bending roller 35, the periphery of which is spaced from the periphery of the disc 27 by a distance corresponding to the thickness of the base of the channel portion 7 of the trim strip. The pivot pin 32 allows the bending arm to be lifted to a vertical position, as shown in dotted lines in FIG. 13, to enable the trim strip to be fitted against the disc 27, and is then lowered so that the base of the channel portion is located between the disc 27 and the roller 35. By swinging the handle and bending lever in a clockwise direction from the position shown in full lines in FIG. 11, the trim strip is bent around the periphery of the disc 27 to the required curvature. Projecting through a hole in the bending arm 33 is a pin 36 which is pressed by a leaf spring 37 against the upper surface of the disc 28. In the disc 28 is an arcuate slot 38 disposed at a radial distance from the axis of spindle 29 equal to the radial distance of the pin 36 from that axis so that when the bending arm moves through a desired angle corresponding to the arc of the corner radius of the windscreen panel, the pin 36 will fall into the slot 38 and prevent return movement of the bending arm. The slot 38, however, allows the bending arm to be moved slightly beyond the desired arc to compensate for slight "spring back" of the strip. When pressure on the handle 34 is released a return spring 39 cooperating with the head 31 moves the bending arm back to the end of the slot where the arm is retained until the bending of all corners of the strip has been effected. Thereafter, by lifing the handle 34, the pin 36 is disengaged from the slot 38 and the spring 39 restores the head and arm to its initial position where the head abuts against a stop 40 projecting from the top of the disc 28.

The retainer members 23 prevent the length of trim strip ahead of the bending device from bulging outwardly during the bending operation.

The method of using the jig is as follows:

The trim strip is first gripped in the end-lock device 22. It is then fitted against the disc 27 of the bending device 21a, with the bending arm raised, and the retainer member 23a is turned to the operative position shown. The bending arm is then lowered and moved in a clockwise direction until the pin 36 reaches the end of the slot 38. The handle is then released and the bending arm remains in the position shown in dotted lines in FIG. 11. The trim strip is then fitted against the bending device 21b, the retainer member 23b is turned to the operative position, and the bending operation is performed around the device 21b. The strip is then similarly bent by means of the bending devices 21c and 21d. The bent strip, when removed from the jig, can be easily fitted around the edge of the windscreen panel. The ends of the strip are joined and aligned by means of an appropriate clip, and spring clips 10 may be fitted at each side of the join and at such other positions around the windscreen panel as may be necessary.

While particular embodiments have been described, it will be understood that various modifications may be made without departing from the scope of the invention. For example, the trim strip could be made of two or more extruded sections, of the same or different materials, which could be bonded together during extrusion or subsequently to form the complete unitary trim strip of this invention.

Further, as shown in FIG. 9, the front of the trim strip may have a facing 41 of metal, e.g., stainless steel, or other suitable material secured thereto, for example by an interengaging or clip connection or by adhesive. The drawing shows the front strip portion 8 as being provided with a dovetail channel 42 with which engage projecting lips 43 along the edges of the folded-back margins 44 of a stainless steel facing section 41 to hold the section 41 assembled to the trim strip 6. The facing section 41 may be wider that the front strip portion 8 which may be desirable where, at least at some places around a windscreen, an extra wide front facing is required. The metal facing section may be bent to shape before assembly to the trim strip.

In modifications of the embodiment of FIG. 10, the adhesive layer 17 may alternatively be disposed between the base of the channel portion 7 and the edge of the glass, or it may be entirely omitted between the glass and the channel portion in which case the adhesive is only disposed between the back of the rear channel wall 7b and the back wall of the rebate.

In another modification of FIG. 10, the mass of adhesive may be located, entirely or at least in part, between the base of the channel portion 7 and the opposing wall of the rebate. Bonding pressure on the adhesive may be achieved by making the base of the channel wedge-shaped or by other appropriate means.

What I claim is:

1. A window assembly in which the glass is adhesively bonded to the back of a rebate defining an opening in which the glass is fitted, comprising a trim strip of a flexible plastics material or rubber-like elastomer, said trim strip comprising a channel portion surrounding the edge of the glass, said channel portion having a front wall with a top edge, a rear wall with a top edge, said front and rear walls being spaced apart by a base portion remote from said top edges, said channel portion being positioned with said front wall adjacent the front surface of the glass and the rear wall adjacent the rear surface of the glass, said trim strip further including a front strip portion joined to said trim strip only along one edge of the front strip portion adjacent said top edge of said front wall to form a junction therewith and having its other edge free, said front strip portion being wider than the depth of said front wall and extending from said top edge of said front wall to overlie said front wall with its free edge projecting beyond said base portion of said channel portion to engage a body portion extending outwardly from the rebate, said free edge of said front strip portion contacting said body portion on positioning said assembly in said rebate to urge said free edge outwardly of said rebate in a direction away from said glass to flex said front strip portion at said junction to thereby urge said top edge of said front wall against said glass, said free edge of said front strip portion providing a contact fit with said body portion.

2. A window assembly according to claim 1 wherein said front strip portion has a strip of metal foil or of a metallized plastic foil adjacent the outer surface of said front strip portion.

3. A window assembly according to claim 1 wherein the channel portion of said trim strip is additionally secured to the edge of the glass by retaining clips secured around said channel portion at positions spaced around the edge of the glass.

4. A window assembly according to claim 1 wherein said rear wall is of less depth than said front wall, and adhesive is applied to the back of the glass around a zone which is hidden behind said front wall and said front strip portion.

5. A window assembly according to claim 1 wherein said front strip portion has a strip of metal foil or of a metallized plastic foil embedded therein, the material of said front strip portion in front of said foil being transparent or translucent.

6. A window assembly according to claim 1 wherein said trim strip is bent around the corners of the glass, said trim strip being stretched whereby said top edge of said front wall portion of said channel is free from buckling.

7. A window assembly according to claim 1 including adhesive adjacent the rear surface of said rear wall for adhering said assembly to said rebate.

8. A window assembly according to claim 1 including adhesive adjacent the rear surface of said glass and adjacent the rear surface of said rear wall for adhering said assembly to said rebate.

9. A window assembly according to claim 1 and including a lip extending along and projecting rearwardly of said top edge of said rear channel wall for engaging a back wall of the rebate.

10. A window assembly according to claim 1, including adhesive comprising a mass of adhesive sealant extending around a zone between the glass and a wall of the rebate which is hidden behind said front channel wall, and wherein cover means are provided for at least partially enclosing the surface of said mass which faces inwardly from the glass.

11. A window assembly according to claim 10 wherein said cover means comprises an interior trim strip provided with securing means extending into the mass of adhesive.

12. A window assembly according to claim 10 wherein said cover means comprises an interior trim strip which overlies said surface of the mass of adhesive and is provided with a skirt which extends over the edge of the rebate.

13. A window assembly according to claim 10 wherein said cover means comprises a flange along the rebate and extending forwardly towards the glass.

14. A method of glazing a window opening in the form of a rebate including a wall to which the assembly is to be adhesively bonded comprising the steps of:
providing a window assembly comprising a trim strip of a flexible plastics or rubber-like elastomer, said trim strip comprising a channel portion surrounding the edge of the glass, said channel portion having a front wall portion with a top edge, a rear wall with a top edge, said front and rear walls being spaced apart by a base portion remote from said top edges, said channel portion being positioned with said front wall adjacent the front surface of the glass and the rear wall adjacent the rear surface of the glass, said trim strip further including a front strip portion joined to said trim strip only along one edge of said front strip portion adjacent said top edge of said front wall to form a junction therewith and having its other edge free, said front strip portion being wider than the depth of said front wall and extending from said top edge of said front wall to overlie said front wall with its free edge projecting beyond said base portion of said channel portion to engage a body portion extending outwardly from the rebate, said free edge of said front strip portion contacting said body portion on positioning said assembly in said rebate to urge said free edge outwardly of said rebate in a direction away from said glass to flex said front strip portion at said junction to thereby urge said top edge of said front wall against said glass, said free edge of said front strip portion providing a contact fit with said body portion;
locating adhesive sealant between said rebate wall and said window assembly; and
inserting the glazing assembly in said rebate with said free edge of said front strip portion of said strip member engaging said body portion to flex said front strip portion along said joint to urge said top edge of said front wall against the glass and to provide a contact fit between said body portion and said free edge of said front strip portion.

15. A method according to claim 14, including the step of securing retaining clips over the channel portion at selected positions around the edge of the glass panel before the assembly is inserted in the rebate.

16. A method according to claim 14, including the step of preshaping the trim strip to the shape of the glass panel by bending a length of trim strip corresponding to the length of the periphery of the glass panel by means of a plurality of bending devices, one for each corner of the glass panel, fixed in positions corresponding to the positions of said corners, the strip being bent at each corner around an arc extending the arc of the corner radius of the glass panel and then being partially released to spring back to the desired arc.

* * * * *